(12) United States Patent
Liu et al.

(10) Patent No.: US 12,476,067 B2
(45) Date of Patent: Nov. 18, 2025

(54) X-RAY TUBE BEARING ASSEMBLY AND X-RAY TUBE

(71) Applicant: Siemens Healthineers AG, Forchheim (DE)

(72) Inventors: Yu Tong Liu, WuXi (CN); Xiao Dong, WuXi (CN); Shan Lu, Wuxi (CN)

(73) Assignee: Siemens Healthineers AG, Forchheim (DE)

( * ) Notice: Subject to any disclaimer, the term of this patent is extended or adjusted under 35 U.S.C. 154(b) by 181 days.

(21) Appl. No.: 18/521,010

(22) Filed: Nov. 28, 2023

(65) Prior Publication Data

US 2024/0186098 A1 Jun. 6, 2024

(30) Foreign Application Priority Data

Dec. 5, 2022 (CN) .......................... 202223250490.X (51) Int. Cl.
*H01J 35/10* (2006.01)
*F16C 19/04* (2006.01)

(52) U.S. Cl.
CPC .......... *H01J 35/1024* (2019.05); *F16C 19/04* (2013.01); *F16C 2380/16* (2013.01)

(58) Field of Classification Search
CPC .. F16C 19/04; F16C 2240/70; F16C 2380/16; H01J 35/1024
See application file for complete search history.

(56) References Cited

U.S. PATENT DOCUMENTS

| | | | | |
|---|---|---|---|---|
| 6,385,293 | B1 * | 5/2002 | Wandke | H01J 35/1024 378/131 |
| 6,445,770 | B1 * | 9/2002 | Wandke | F16C 37/007 378/127 |
| 2021/0350996 | A1 * | 11/2021 | Tapadia | H01J 35/1024 |

FOREIGN PATENT DOCUMENTS

| | | |
|---|---|---|
| CN | 101504040 A | 8/2009 |
| CN | 207984944 U | 10/2018 |

* cited by examiner

*Primary Examiner* — Mark R Gaworecki
(74) *Attorney, Agent, or Firm* — Banner & Witcoff, Ltd.

(57) ABSTRACT

An X-ray tube bearing assembly may include a bearing housing including an accommodating cavity; and a bearing core accommodated in the accommodating cavity. The bearing housing may include first and second portions. The second portion surrounds and forms a portion of the accommodating cavity to accommodate the bearing core. The first portion extends out of the second portion and surrounds and forms another portion of the accommodating cavity, and the other portion of the accommodating cavity forms an accommodating hollow cavity. The first portion may have a different structural rigidity to that of the second portion.

12 Claims, 6 Drawing Sheets

X-RAY TUBE BEARING ASSEMBLY AND X-RAY TUBE

CROSS REFERENCE TO RELATED APPLICATIONS

This patent application claims priority to Chinese Patent Application No. 202223250490.X, filed Dec. 5, 2022, which is incorporated herein by reference in its entirety.

BACKGROUND

Technical Field

The present disclosure relates to the field of machinery; in particular, the present disclosure relates to an X-ray tube bearing assembly, and further relates to an X-ray tube.

Related Art

In an operating process, an X-ray tube generates vibrations, including system vibrations in start, stop and normal working states. These vibrations generate strange noises during the operating process of an X-ray tube assembly. Therefore, those skilled in the art are concerned with the technical problem of mitigating vibrations.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components have not been described in detail to avoid unnecessarily obscuring embodiments of the disclosure.

The present disclosure provides an X-ray tube bearing assembly, and an X-ray tube.

According to an exemplary embodiment of the present disclosure, an X-ray tube bearing assembly may include: a bearing housing, which is provided with an accommodating cavity; and a bearing core, which is accommodated in the accommodating cavity of the bearing housing. The bearing housing may include a first portion and a second portion. The second portion surrounds and forms a portion of the accommodating cavity to accommodate the bearing core. The first portion extends out of the second portion and surrounds and forms another portion of the accommodating cavity, and the other portion of the accommodating cavity forms an accommodating hollow cavity. The first portion has a different structural rigidity to that of the second portion.

According to an exemplary embodiment of the present disclosure, the structural rigidity of the first portion is less than the structural rigidity of the second portion.

According to an exemplary embodiment of the present disclosure, the bearing core comprises balls.

According to an exemplary embodiment of the present disclosure, the first portion comprises multiple openwork portions.

According to an exemplary embodiment of the present disclosure, a tube wall of the first portion comprises multiple grooves.

According to an exemplary embodiment of the present disclosure, the shapes of the multiple openwork portions are straight strip shapes extending in a direction parallel to the axial direction of the bearing.

According to an exemplary embodiment of the present disclosure, the multiple openwork portions at least comprise one of the following shapes: a straight strip shape which forms a certain angle with the axial direction of the bearing, the angle being greater than or equal to 0 degrees; an arc strip shape; a wavy strip shape; a circular shape; and an elliptical shape.

In an exemplary embodiment of the present disclosure, the number of multiple openwork portions is 2-20.

According to an exemplary embodiment of the present disclosure, the multiple openwork portions are arranged symmetrically with respect to the axis of the bearing.

According to an exemplary embodiment of the present disclosure, the materials of the first portion and the second portion are different, and the first portion and the second portion are fixedly connected together.

According to an exemplary embodiment of the present disclosure, the thickness of an accommodating cavity tube wall where the multiple openwork portions are located at least comprises one of the following forms: uniform thickness; the thickness linearly changing in a direction parallel to the axis of the bearing; and the thickness changing non-linearly in the direction parallel to the axis of the bearing.

According to an exemplary embodiment of the present disclosure, an X-ray tube is provided, comprising: a cathode assembly; and an anode assembly, the anode assembly comprising any one of the X-ray tube bearing assemblies mentioned previously.

Figure 1:
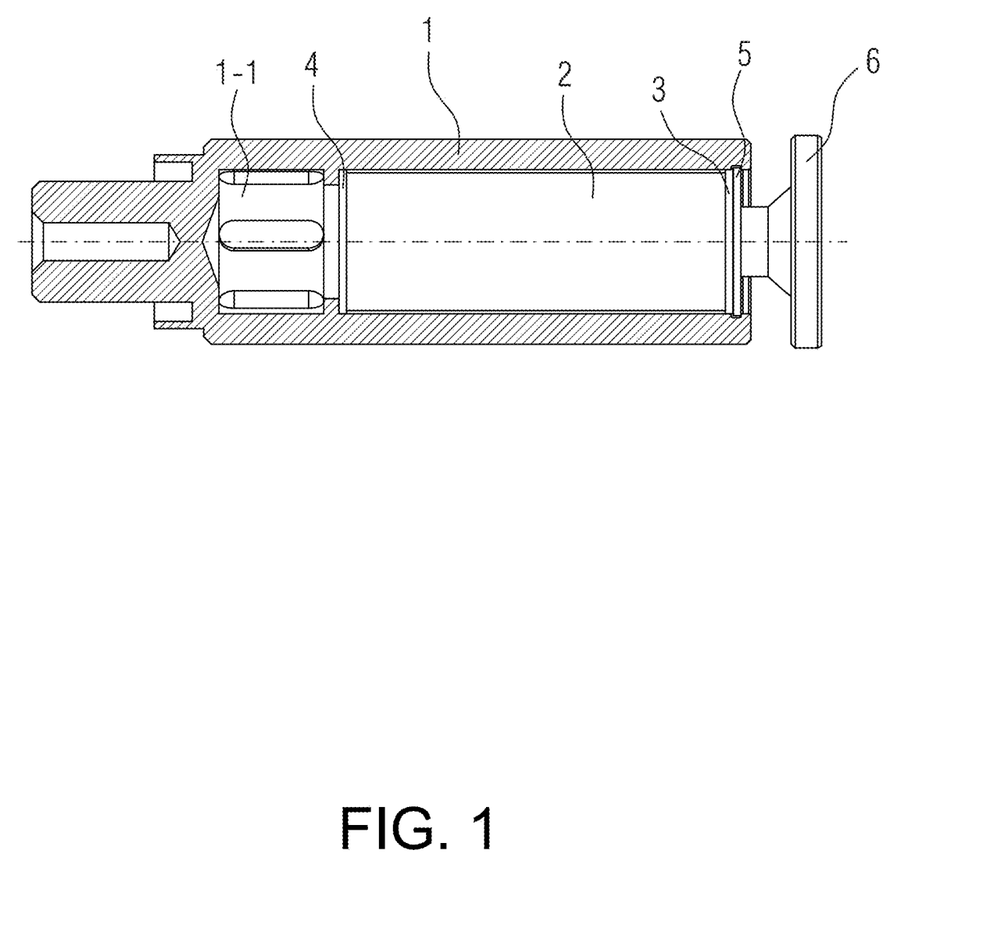
FIG. 1 is a cut-away view of an X-ray tube bearing assembly having an elastic support structure according to the present disclosure.
Figure 2:
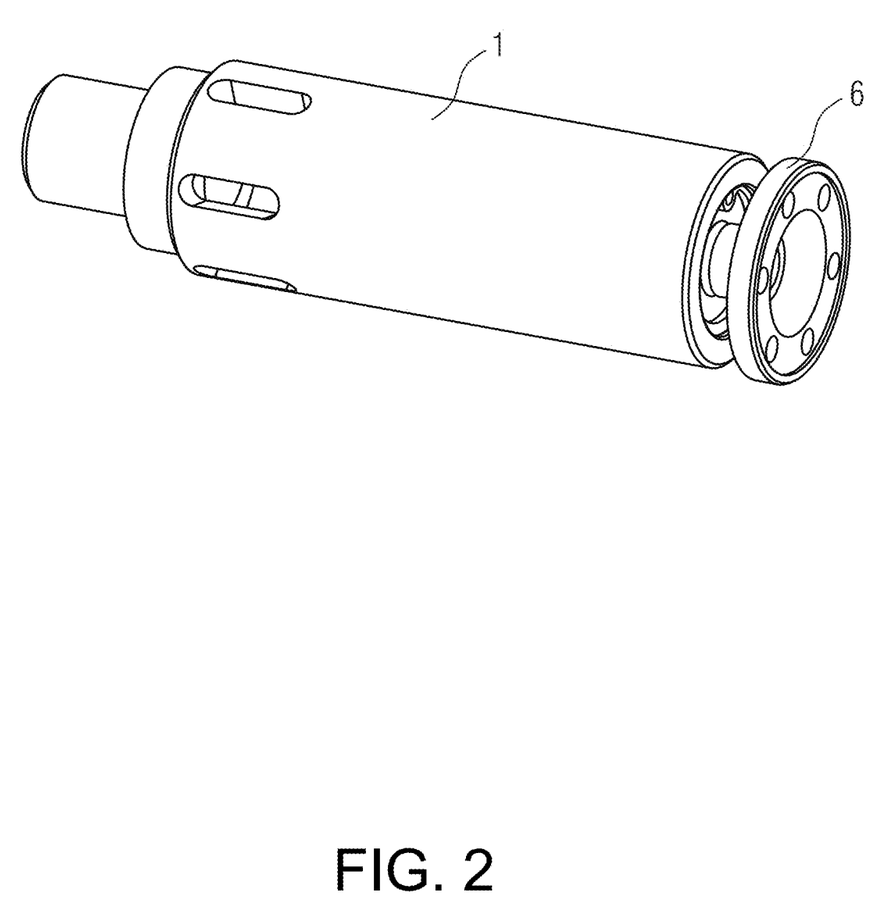
FIG. 2 is a perspective view of the X-ray tube bearing assembly shown in FIG. 1.

In an exemplary embodiment, specifically with reference to FIGS. 1-2, an X-ray tube bearing assembly of the present disclosure may comprise: a bearing housing 1, which is provided with an accommodating cavity; and a bearing core 2, which is accommodated in the accommodating cavity of the bearing housing 1, wherein the bearing housing 1 may comprise a first portion and a second portion; the second portion surrounds and forms a portion of the accommodating cavity to accommodate the bearing core 2; the first portion extends out of the second portion and surrounds and forms another portion of the accommodating cavity, and the other portion of the accommodating cavity forms an accommodating hollow cavity; and the first portion has a different structural rigidity to that of the second portion. Inventors of the present application have discovered that an elastic material disposed on a vibration path can effectively absorb vibrations, thereby stopping the transmission of vibrations. In the embodiment shown in FIG. 1, the bearing housing 1 is divided into two portions: a second portion, which forms an accommodating cavity which accommodates the bearing core 2, and a first portion which does not accommodate the bearing core 2, and they are demarcated from each other by a stepped hole. The first portion and second portion of the bearing housing 1 have different structural rigidities; this difference in structural rigidity may be due to the materials of the two portions being different, or may be caused by accommodating cavity tube walls of the two portions having different structures. For example, a tube wall of the first portion is open-worked, or the tube wall is thinner, or the tube wall has grooves. By this means, according to the source of vibrations, one of the first portion and second portion can absorb the vibrations, thereby reducing the possibility of strange noises of an entire bearing.

In an exemplary embodiment, especially with reference to FIGS. 1-2, the structural rigidity of the first portion is less than the structural rigidity of the second portion. Structural rigidity indicates the capability of a structure to resist deformation; the greater the structural rigidity, the less easily the material deforms. In this embodiment, the first portion provided with a hollow cavity has less structural rigidity, that is, deforms more easily. The second portion which enwraps the bearing core 2 has greater structural rigidity, that is, is less apt to deform. In certain situations, such a configuration is effective, the second portion cooperating with the bearing core 2 has a high structural rigidity and does not easily deform, ensuring the stability of rotation of a rotation shaft, whereas the first portion provided with the hollow cavity has a low structural rigidity and easily deforms, used for absorbing vibrations. By means of optimising or reducing the rigidity of the first portion, the present embodiment reduces the transmission of energy of vibrations of a bearing to other portions of the X-ray tube assembly, thereby achieving the objectives of reducing system vibrations and noise.

In an exemplary embodiment, especially with reference to FIGS. 1-2, the bearing core 2 comprises balls. The bearing core 2 comprises an outer ring, balls and a shaft (not shown), wherein the outer ring fits closely with the bearing housing, and the shaft uses the rolling of the balls to rotate relative to the outer ring and bearing housing 1. The shaft is connected to a flange 6, the flange 6 is connected to an anode, and the shaft rotates together with the anode. Regarding X-ray tube bearings, there are ball bearings and liquid-metal bearings; they respectively fill the gap between the shaft and outer ring using balls and liquid metal. The present embodiment especially focuses on ball bearings, because the inventors discovered that the present solution is especially effective for ball bearings.

In an exemplary embodiment, especially with reference to FIGS. 1-2, the first portion comprises multiple openwork portions. Here, we call the openwork portion an elastic strip 1-1. In this embodiment, the materials of the first portion and the second portion are the same, and, using multiple strip-shaped openwork elastic strips 1-1 processed in the first portion, such a mechanical structure is used to increase the elasticity of the first portion. Here, "multiple" refers to two or more than two. The structure of these elastic strips 1-1 reduces the structural rigidity of the first portion, such that same deforms more under the same stress, thereby effectively absorbing vibrations.

In an exemplary embodiment, a tube wall of the first portion comprises multiple grooves. Unlike the openwork penetrating through the tube wall of the first portion of the bearing housing 1, in this embodiment, grooves are arranged on but do not penetrate through the tube wall of the bearing housing 1. Using this type of structure, the structural rigidity of the first portion may likewise be reduced, thereby achieving the objective of absorbing vibrations. Those skilled in the art will understand that reference can be made to the way in which the openwork is configured in the present application for the way in which these grooves are arranged.

In an exemplary embodiment, especially with reference to FIGS. 1-2, the shapes of the multiple openwork portions are straight strip shapes extending in a direction parallel to the axial direction of the bearing. The axial direction of the bearing is shown by the dotted line in FIG. 1, the shape of the elastic strip 1-1 is shown in FIGS. 1-2, being a strip shape, and the lengthwise direction thereof extending in a direction parallel to the axial direction.

Figure 4:
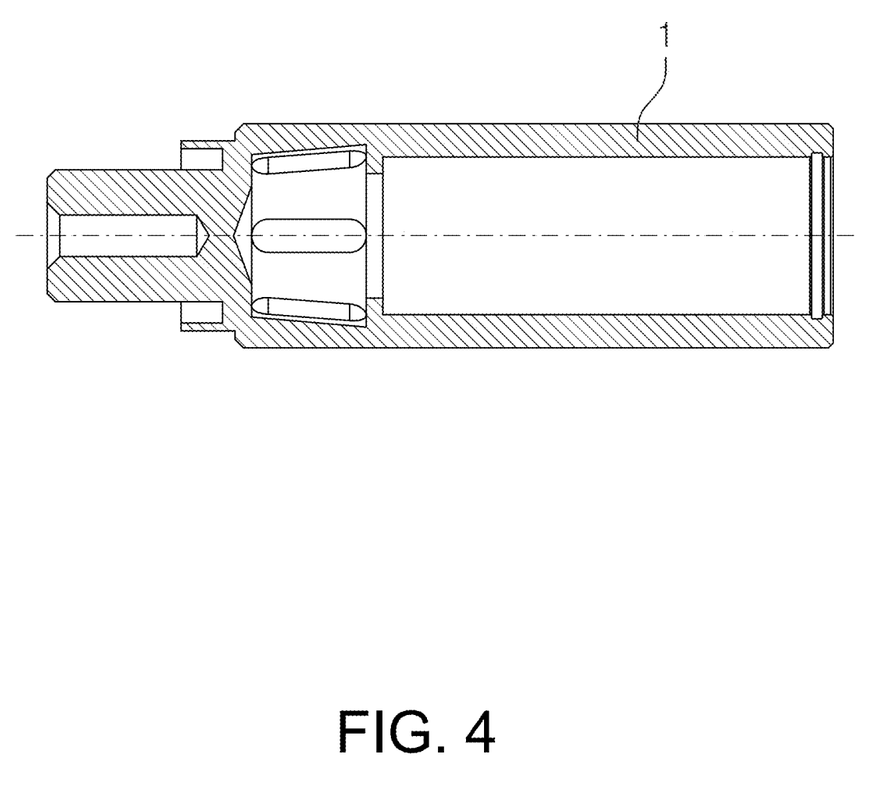
FIG. 4 is a cut-away view of an X-ray tube bearing housing having an elastic support structure according to the present disclosure.
Figure 5:
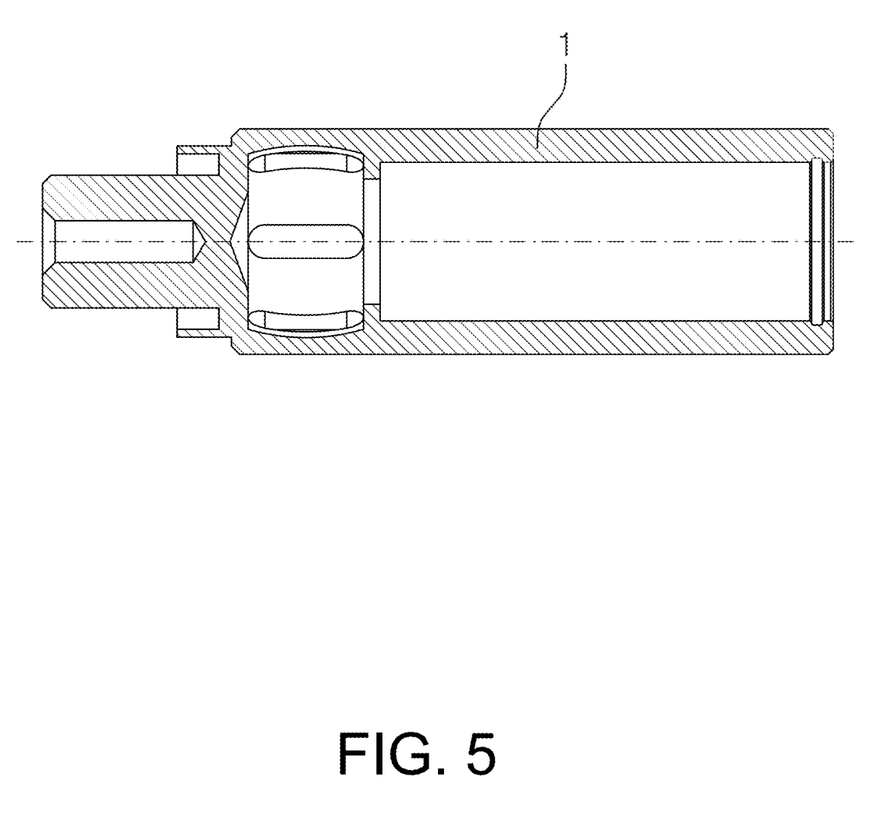
FIG. 5 is a cut-away view of an X-ray tube bearing housing having an elastic support structure according to the present disclosure.
Figure 6:
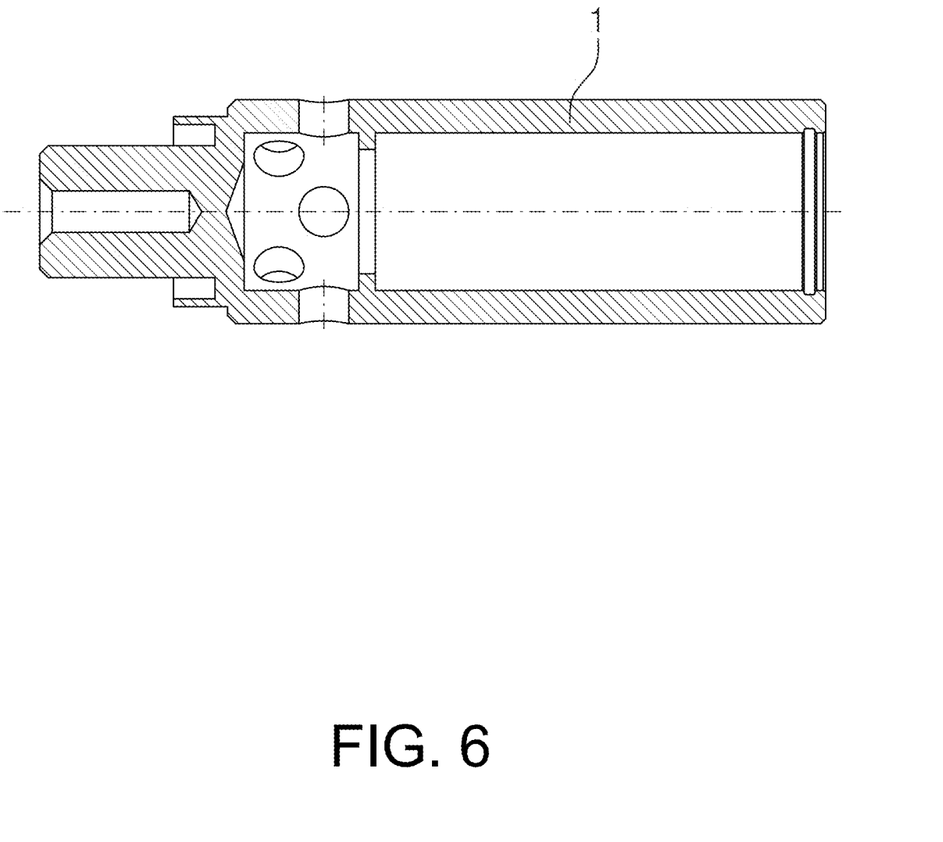
FIG. 6 is a cut-away view of an X-ray tube bearing housing having an elastic support structure according to the present disclosure.

In an exemplary embodiment, especially with reference to FIGS. 4-6, the multiple openwork portions at least comprise one of the following shapes: a straight strip shape which forms a certain angle with the axial direction of the bearing, the angle being greater than or equal to 0 degrees; an arc strip shape; a wavy strip shape; a circular shape; and an elliptical shape. In this embodiment, the openwork portions may be multiple shapes, for example, the straight strip shape which forms a certain angle with the axial direction, as shown in FIG. 4, wherein the angle may be an acute angle or may be a right angle, or an arc shape, as shown in FIG. 5, or a circle, as shown in FIG. 6, or an ellipse (not shown). Of course, in the same solution, there may be a combination of different shapes, that is, the multiple openwork portions are at least two of the shapes mentioned above.

In an exemplary embodiment, especially with reference to FIGS. 1-2 and 4-6, the number of multiple openwork portions is 2-20. If they are strip shapes, the number may be set to fewer; if circles or ellipses, the number may be set to comparatively more. For example, 6-8 strip shapes may be provided. 12-20 circles may be provided, or even more; if each circular openwork area is smaller, 30 may be provided, as long as the mechanical strength of the bearing housing 1 is ensured.

In an exemplary embodiment, especially with reference to FIGS. 1-6, the multiple openwork portions are arranged symmetrically with respect to the axis of the bearing. A symmetrical arrangement is usually important, ensuring the center of gravity is on the axis of the bearing, which can ensure stability of rotation.

In an exemplary embodiment, the materials of the first portion and the second portion are different, and the first portion and the second portion are fixedly connected together. Unlike using openwork mechanical shapes to improve structural rigidity, this embodiment uses characteristics of the materials themselves. Specifically, different materials are used for the first portion and second portion; illustratively, the materials used are such that the first portion has greater structural rigidity. The two portions are fixedly connected together, for example, by welding. This type of means also may realize the function of absorbing vibrations.

In an exemplary embodiment, the thickness of an accommodating cavity tube wall where multiple openwork portions are located at least comprises one of the following forms: uniform thickness; the thickness linearly changing in a direction parallel to the axis; and the thickness changing non-linearly in the direction parallel to the axis. Inventors of the present application have discovered that the thickness of the openwork portion also affects absorption of vibrations; in this embodiment, the openwork thickness may be designed to be uniform thickness, that is, the thickness at each place of the openwork is the same, for example as shown in FIG. 1. The thickness further may linearly change in a direction parallel to the bearing axis, such as linearly reducing, for example as shown in FIG. 4. The thickness further may change non-linearly in the direction parallel to the bearing axis, such as changing in an arc, and FIG. 5 provides a schematic of a change in a circular form. The thickness further may be of a curved form, or may be a combination of multiple types; this combination may be a combination of each openwork having a different form, such as a section being linear and a section being curved, or certain openworks may be linear and certain openworks may be curved on the same bearing housing. The above combinations are all optional.

In an exemplary embodiment, especially with reference to FIG. 1, the bearing housing 1 comprises a stepped hole and a snap ring groove for axially positioning the bearing core 2, and the bearing core 2 further comprises: a front-end sealing plate 3, a rear-end sealing plate 4 and a snap ring 5; one side of the rear-end sealing plate 4 abuts the stepped hole, and one side of the front-end sealing plate 3 abuts the snap ring 5; and the snap ring 5 snaps into the snap ring groove. This embodiment provides a means for fixing the bearing core 2 to the accommodating cavity of the second portion of the bearing housing 1. The front-end sealing plate 3 and the rear-end sealing plate 4 are used to clamp the bearing core 2, wherein the snap ring 5 is used to fix the front-end sealing plate 3 in position, and the stepped hole on the inner wall of the bearing housing 1 is used to position the rear-end sealing plate 4, thereby fixing the position of the bearing core 2 in the axial direction. Moreover, an outer surface of the bearing core 2 may be in interference fit with an inner surface of the bearing housing 1, thereby further fixedly connecting the bearing housing 1 to the bearing core 2. This fixing means is merely exemplary, and other fixing means may be used in the present solution.

Figure 3:
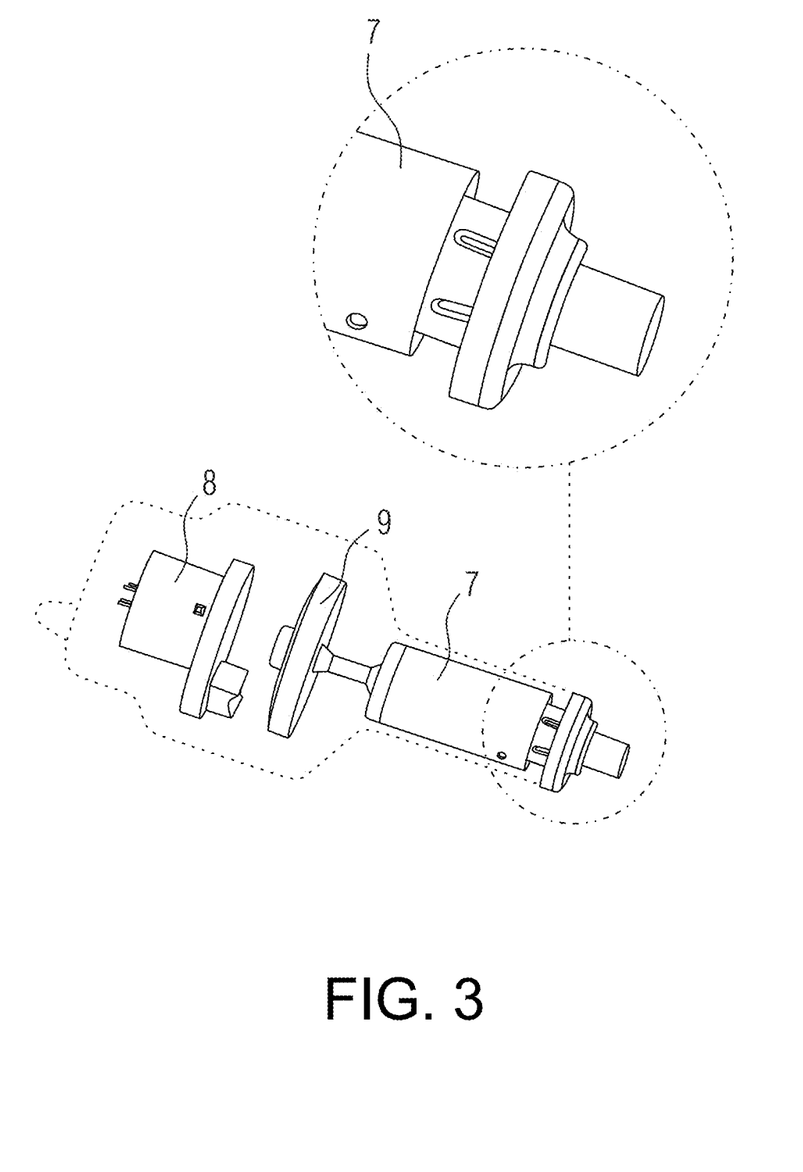
FIG. 3 is a perspective view and partial enlarged view of an X-ray tube with a bearing having an elastic support structure according to the present disclosure.

In an exemplary embodiment, an X-ray tube is disclosed, specifically with reference to FIG. 3, comprising: a cathode assembly 8; and an anode assembly 9, the anode assembly 9 comprising any one of the X-ray tube bearing assemblies mentioned previously. In the embodiments shown in FIGS. 1-3, a shaft in the bearing core 2 is connected to a rotor 7 by means of a flange 6, and the rotor 7 is connected to the anode in the anode assembly 9. During operation, the anode, and the shaft in the bearing core 2 rotate under the drive of the rotor 7, and at this time, the bearing housing 1, and an outer ring of the bearing core 2 do not rotate with the rotor 7.

In an exemplary embodiment, specifically with reference to FIGS. 1-3, one end of the X-ray tube bearing assembly is connected to a target disk, and the other end is connected to a housing of the X-ray tube assembly, and in this way, the target disk, bearing assembly and housing together form a cantilever structure. Vibrations of the bearing are a source of vibrations of the whole X-ray tube assembly. The energy of vibrations of the bearing is transmitted to other parts of the X-ray tube assembly by means of the bearing housing, causing vibrations and strange noises of the X-ray tube assembly. Therefore, to reduce vibrations of the X-ray tube assembly, one option is to rely on high requirements and high precision regarding the design and manufacture of the X-ray tube bearing assembly, as well as regarding a surrounding fixing structure; even with this, it is still difficult to completely prevent the generation of strange noise. Due to the limitations of force-bearing and practical conditions of the X-ray tube bearing assembly, it is difficult to reduce vibrations of the X-ray tube assembly by means of the design of the bearing core. In the present embodiment, an X-ray tube bearing assembly having an elastic support structure is used, and, by means of reducing the rigidity of a bearing housing, on the basis that a surrounding fixing structure of the bearing assembly is unchanged, energy of vibrations of a bearing transmitted to other components is reduced, effectively reducing overall vibrations of an X-ray tube assembly in an operating process, reducing noise. In this embodiment, the X-ray tube bearing assembly having an elastic support structure comprises a bearing housing 1 having elastic strips 1-1, and a bearing core 2 having a flange plate, wherein the bearing core 2 comprises a front-end sealing plate 3, a rear-end sealing plate 4, a snap ring 5, etc.; for details, see FIG. 1. The function of the X-ray tube bearing assembly having an elastic support in the present embodiment is realized as follows: the bearing housing 1 has a certain number of elastic strips 1-1 of a certain length, the elastic strips thereof may absorb energy of vibrations generated during the operation of the X-ray tube bearing assembly, reducing the overall vibrations of the X-ray tube assembly, thereby reducing noise during the operating process of the system. According to different practical working situations, comprising working situation conditions such as rotation speed, temperature, amount of motion imbalance and size of target disk, by means of adjusting the number, length, shape and wall thickness of the elastic strips, vibrations of the system can be regulated under different working situation conditions. Dynamic characteristics of the system are improved, vibrations are reduced, operating stability of the system is improved, noise during an operating process of the system is reduced, and the generation of resonance and strange noises is prevented.

The bearing housing 1 has a stepped hole and snap ring groove used for axially positioning the bearing core; the rear-end sealing plate 4 and the front-end sealing plate 3 are fitted in the bearing housing, and the snap ring 5 is used to axially fix same. By means of the front-end sealing plate 3 and the rear-end sealing plate 4, the bearing core 2 is isolated as a sealed space, preventing particles, from wear and tear in the operating process of the bearing, from entering the X-ray tube via a gap of the elastic strip 1-1 or the front end of the bearing, while also preventing external particles during manufacture of the X-ray tube from entering the interior of the bearing core.

The X-ray tube bearing assembly having an elastic support is fitted in an X-ray tube, and, by means of reducing the rigidity of the bearing housing, energy of vibrations of the bearing transmitted to other components is reduced, effectively reducing overall vibrations of the X-ray tube assembly in an operating process, reducing noise.

In an exemplary embodiment, specifically with reference to FIGS. 4-6, the elastic strip structure in the present embodiment is merely exemplary; the structural form thereof is not limited, and for example, forms a certain included angle with the axial direction (see FIG. 4), or is a non-linear elastic strip (see FIG. 5), or is a circle (see FIG. 6), etc. The thickness of the elastic strip may be designed, according to requirements for rigidity, as uniform thickness (as in FIG. 1) or varied in the axial direction, such as a slanted surface (see FIG. 4), a spherical surface (see FIG. 5) or another structural form. The bearing housing structural form is not limited to the forms shown in the figures in the present embodiments; other types of X-ray tube bearings may all be used.

The particular embodiments of the present disclosure at least have the following characteristics: reducing system noise, preventing the generation of strange noises of the X-ray tube assembly during an operating process, and reducing design and manufacturing requirements of an X-ray tube bearing and a target disk assembly regarding the surrounding fixing structure.

In the present disclosure, words relating to orientation such as "up, down, left, right" are merely exemplary relative directions shown in the figures, and do not correspond to the direction of gravity in a usage state. In addition, the terms "first", "second", etc. used in the present disclosure are for distinguishing one key element from another key element, and do not possess properties of order and importance. In addition, in the description below, when the figures are mentioned, unless otherwise explained, identical reference labels in different figures indicate identical or similar key elements. The above definitions are merely for explaining and illustrating the present disclosure, and should not be understood as limiting the present disclosure.

It should also be noted that the specific technical features described in the above detailed description can be combined in any suitable manner if there is no contradiction. In order to avoid unnecessary repetition, various possible combinations will not be further illustrated in the present disclosure.

The above are merely exemplary embodiments of the present disclosure, which are not intended to limit it. Any amendments, equivalent substitutions or improvements, etc. made within the spirit and principles of the present disclosure shall be included in the scope of protection thereof.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 bearing housing
1-1 elastic strip
2 bearing core
3 front-end sealing plate
4 rear-end sealing plate
5 snap ring
6 flange
7 rotor
8 cathode assembly
9 anode assembly

The invention claimed is:

1. An X-ray tube bearing assembly, comprising:
a bearing housing including an accommodating cavity, wherein the bearing housing comprises a first portion and a second portion, the first portion having a different structural rigidity to that of the second portion; and
a bearing core accommodated in the accommodating cavity of the bearing housing, wherein the second portion surrounds and forms a portion of the accommodating cavity configured to accommodate the bearing core, the first portion extends out of the second portion and surrounds and forms another portion of the accommodating cavity, and the other portion of the accommodating cavity forms an accommodating hollow cavity.

2. The X-ray tube bearing assembly as claimed in claim 1, wherein the structural rigidity of the first portion is less than the structural rigidity of the second portion.

3. The X-ray tube bearing assembly as claimed in claim 2, wherein the first portion comprises multiple openwork portions.

4. The X-ray tube bearing assembly as claimed in claim 3, wherein shapes of the multiple openwork portions are straight strip shapes extending in a direction parallel to an axial direction of the bearing.

5. The X-ray tube bearing assembly as claimed in claim 3, wherein the multiple openwork portions comprise:
a straight strip shape which forms an angle with an axial direction of the bearing, the angle being greater than or equal to 0 degrees;
an arc strip shape;

a wavy strip shape;

a circular shape; and/or an elliptical shape.

6. The X-ray tube bearing assembly as claimed in claim 3, wherein the multiple openwork portions comprise 2 to 20 openwork portions.

7. The X-ray tube bearing assembly as claimed in claim 3, wherein the multiple openwork portions are arranged symmetrically with respect to an axis of the bearing.

8. The X-ray tube bearing assembly as claimed in claim 3, wherein a thickness of an accommodating cavity tube wall in which the multiple openwork portions are located is:

uniform;

linearly changes in a direction parallel to an axis of the bearing; or non-linearly changes in the direction parallel to the axis of the bearing.

9. The X-ray tube bearing assembly as claimed in claim 2, wherein a tube wall of the first portion comprises multiple grooves.

10. The X-ray tube bearing assembly as claimed in claim 2, wherein materials of the first portion and the second portion are different, the first portion and the second portion being fixedly connected together.

11. The X-ray tube bearing assembly as claimed in claim 1, wherein the bearing core comprises balls.

12. An X-ray tube, comprising:

a cathode assembly; and an anode assembly, the anode assembly comprising the X-ray tube bearing assembly as claimed in claim 1.

* * * * *